United States Patent [19]

Calandra, Jr. et al.

[11] Patent Number: 5,385,433
[45] Date of Patent: Jan. 31, 1995

[54] BEARING PLATE

[75] Inventors: Frank Calandra, Jr., Pittsburgh; John C. Stankus, Canonsburg; Eugene H. Stewart, Pittsburgh, all of Pa.; Dominic Cricelli, Flora, Ill.

[73] Assignee: Jennmar Corporation, Pittsburgh, Pa.

[21] Appl. No.: 156,066

[22] Filed: Nov. 22, 1993

Related U.S. Application Data

[63] Continuation-in-part of Ser. No. 61,841, May 14, 1993, Pat. No. 5,292,209.

[51] Int. Cl.⁶ .................. E21D 21/00; F16B 43/02
[52] U.S. Cl. .................. 405/302.1; 405/259.1; 411/545
[58] Field of Search .................. 405/259.1–259.6, 405/302.1; D8/399, 353; 411/539, 544, 545, 154, 155, 156, 10, 11

[56] References Cited

U.S. PATENT DOCUMENTS

| | | | |
|---|---|---|---|
| 2,398,130 | 4/1946 | Beij | 405/259.1 |
| 2,850,937 | 9/1958 | Ralston | 405/259.1 X |
| 3,133,468 | 5/1964 | Cumming | 411/11 |
| 4,095,431 | 6/1978 | Hannan | 405/259.1 |
| 4,112,693 | 9/1978 | Collin et al. | 405/302.1 |
| 4,451,179 | 5/1984 | Bower | 405/302.1 X |
| 4,498,815 | 2/1985 | Dye | 405/302.1 |
| 4,507,020 | 3/1985 | Zeitler et al. | 405/302.1 |
| 4,708,559 | 11/1987 | Locotos | 405/302.1 X |

FOREIGN PATENT DOCUMENTS

1192635 10/1959 France ................... 405/302.1

Primary Examiner—Dennis L. Taylor
Attorney, Agent, or Firm—Stanley J. Price, Jr.

[57] ABSTRACT

An elongated channel beam for supporting the surface of an underground rock formation includes a base portion with a bearing surface for contacting the rock strata and an opposite surface having a longitudinally extending central rib and flanged edges for resisting deflection and bending of the channel beam under the load of the rock strata. A plurality of openings spaced a preselected distance apart extend through the central rib. A bearing plate is positioned in overlying abutting relation with each opening in the channel beam. The bearing plate includes embossed areas and longitudinally flanged edges that overlie in abutting relation the central rib and flanged edges of the channel beam. The bearing plate is restrained from longitudinal and lateral movement on the channel beam. Anchor bolts extend through the aligned openings in the bearing plate and channel beam into bore holes drilled in the rock formation. Tightening the anchor bolt compresses the bearing plate against the channel beam with the compressive forces distributed over the surface of the bearing plate and transmitted throughout the channel member to support the rock formation.

35 Claims, 7 Drawing Sheets

BEARING PLATE

CROSS REFERENCE TO RELATED APPLICATION

This application is a continuation-in-part of copending U.S. application Ser. No. 061,841 filed May 14, 1993, now U.S. Pat. No. 5,292,209, entitled "Bearing Plate".

BACKGROUND OF THE INVENTION

1. Field of the Invention

This invention relates to method and apparatus for supporting a rock formation and, more particularly, to a bearing plate having an embossed configuration for reinforcing a channel member exerting a compressive force on the rock formation.

2. Description of the Prior Art

In underground mining, excavation and tunnelling operations, it is conventional practice to support the overhead and lateral rock strata by elongated structural members, such as metal roof mats and channels, that extend transversely across the mine roof and downwardly along the lateral sidewalls or ribs. The mats and channels are provided in various lengths with holes spaced a preselected distance apart through the members to conform to a conventional roof bolt plan. Roof bolts extend through the holes in the channels and into holes drilled in the rock strata and are anchored in the strata to maintain the channels compressed against the surface of the rock strata. The metal mats and channels are preferably used in place of wood timbers and are more efficiently installed in combination with a roof bolting system.

U.S. Pat. No. 2,192,554 discloses an improvement over wood timbering structures in which concrete roof beams are supported in contact with a mine tunnel roof by horizontal metal props connected at their end portions to vertical props. The vertical props extend to the mine floor oppositely the mine rib or wall. This arrangement forms a truss of interlocking parts for reinforcing the roof beams. U.S. Pat. No. 3,413,812 is another example of elongated beam members connected to one another for supporting an underground rock formation.

It is also known to utilize elongated members that overlap at their end portions to form a sliding joint in an arc-type support. Examples of interconnected trough-shaped sections for supporting a rock formation are disclosed in U.S. Pat. Nos. 3,023,862; 3,076,672; 3,126,708 and 3,168,815.

U.S. Pat. No. 3,022,100 discloses an arc support formed by three sections that overlap at their end portions. U.S. Pat. No. 3,395,542 discloses a propping frame having two upright members for supporting interconnecting members forming an arc.

As indicated above, it is common practice to utilize elongated mats and channels as part of a mine roof bolt plan. In a conventional roof bolt plan, bore holes are drilled into the rock formation in accordance with a preselected pattern so that the bolts are positioned a preselected distance apart and extend a preselected depth into the rock formation. The roof bolts are anchored in the bore holes and tensioned to exert a compressive force upon the rock strata to prevent deterioration of the overhead rock strata.

It is also conventional practice in the installation of mine roof bolts to use bearing plates to support the area of the rock formation around the bore hole. A conventional bearing plate includes a contact or bearing surface for abutting the formation around the bore hole. The bearing plate includes a central hole for receiving a roof bolt which extends through the plate up into the bore hole. The lower end of the roof bolt includes an enlarged head which bears against the area of the plate around the bore hole.

To rigidify bearing plates to resist deflection and bending when compressed against the rock formation, bearing plates are provided with embossments which extend from the surfaces of the bearing plates. Examples of known bearing plates having embossments are disclosed in U.S. Pat. Nos. 2,748,594; 2,854,824; 3,090,203;. 3,226,934; 3,238,731; 3,478,523; 3,544,053; 4,037,418; and 4,249,835 and French Patent Nos. 1,222,640 and 1,304,298.

It is known to use bearing plates to compress roof mats or channel supports against a mine roof. When used with mats and channels, the bearing plate is positioned in overlying relation with the channel so that the opening in the channel is aligned with the opening in the roof plate. In one method, the roof plate has a length to be received within an elongated slot of the channel. In the alternative, the surface of the bearing plate extends beyond the channel slot and bears against the areas of the channel around the slot. A roof bolt assembly is extended through the aligned holes in the bearing plate and channel up into the bore hole where the bolt is anchored and placed in tension to compress the bearing plate and channel against the mine roof.

Because of the extended length of the mat or channel, it is subject to deflection and bending when anchored by the roof bolts into compressive relation with the rock strata. Therefore, there is need for a channel or mat having a structure that is reinforced to resist deflection and bending under the load of the rock formation. The channel shaped support structure should be maintained in compressive relation with the surface of the rock formation by a bearing plate maintained in contact with the channel by the anchored roof bolt. The bearing plate should have a configuration that permits its installation within the width of the channel and in overlying relation with the opening in the channel. The bearing plate should have a configuration which stabilizes the bearing plate on the channel and also serves to reinforce the channel to resist deflection loads.

SUMMARY OF THE INVENTION

In accordance with the present invention, there is provided apparatus for supporting a rock formation that includes an elongated member having a base portion with a length substantially greater than a width defining longitudinal edges forming a channel therebetween. The base portion has a bearing surface for contacting the rock formation and an opposite surface. At least one opening extends through the elongated member base portion. A bearing plate includes a contact surface and an outer surface. The contact surface is positioned in overlying abutting relation with the elongated member opposite surface. An embossed area extends outwardly from the plate outer surface and has a central opening therethrough. The plate central opening is aligned with the elongated member opening. The plate embossed area extends on said bearing plate outwardly from the bearing plate central opening. The plate embossed area is positioned in overlying relation with the elongated base portion opposite surface for reinforcing the elongated member. Anchor means extends through the aligned openings into the rock formation and bears against the plate embossed area for urging the bearing plate into compressive engagement with the elongated member to reinforce the elongated member compressed against the rock formation to support the rock formation.

Further, in accordance with the present invention, there is provided a bearing plate that includes a planar body portion having a longitudinal axis defining planar longitudinal edges and planar transverse edges. A contact surface is positioned on one side of the body portion for engaging a generally planar surface and on the opposite side of the body portion is provided an outer surface. An embossment extends outwardly from the body portion outer surface. The embossment includes a central embossed area and a longitudinally extending embossed area formed integral with the central embossed area on the body portion. The central and longitudinally extending embossed areas rigidify the body portion to resist deflection. The central embossed area includes a central opening therethrough. The longitudinal edges extend angularly from the body portion outer surface to form flanges for stiffening the longitudinal edges to resist bending.

Additionally, the present invention is directed to a method for supporting a rock formation that includes the steps of positioning an elongated channel member in contact with a planar surface of a rock formation. Longitudinal edges of the channel member are reinforced to stiffen the channel member to resist bending. Openings are positioned in the channel member in spaced relation along the longitudinal length of the channel member. A bearing plate having a contact surface is positioned in overlying abutting relation with the channel member around each opening therethrough. Longitudinal edges of the bearing plate are reinforced to stiffen the bearing plate to resist bending. The bearing plate longitudinal edges are positioned in abutting relation with the channel member longitudinal edges. An anchor bolt extends through the aligned openings in the bearing plate and the channel member into engagement with the rock formation to compress the bearing plate against the channel member to maintain the channel member in compressive contact with the surface of the rock formation. The compressive forces applied to the bearing plate are transmitted from the bearing plate longitudinal edges to the channel member longitudinal edges.

Accordingly, a principal object of the present invention is to provide method and apparatus for supporting a rock formation by an elongated mat or channel reinforced by bearing plates compressed against the mat or channel to resist bending of the mat or channel when anchored to the rock formation.

Another object of the present invention is to provide a reinforced mine roof support channel or mat used with bearing plates having a configuration complementary with the reinforced configuration of the mat or channel so that the compressive forces applied by anchor bolts to the mat or channel are taken up by the bearing plates and distributed over the surface of the mat or channel and not concentrated at a central point on the mat or channel.

A further object of the present invention is to provide a bearing plate for reinforcing a rock formation in which the bearing plate has an embossed configuration for strengthening the plate to resist bending when compressed against the rock formation.

These and other objects of the present invention will be more completely disclosed and described in the following specification, the accompanying drawings and the appended claims.

DESCRIPTION OF THE PREFERRED EMBODIMENTS

Figures 1, 2:
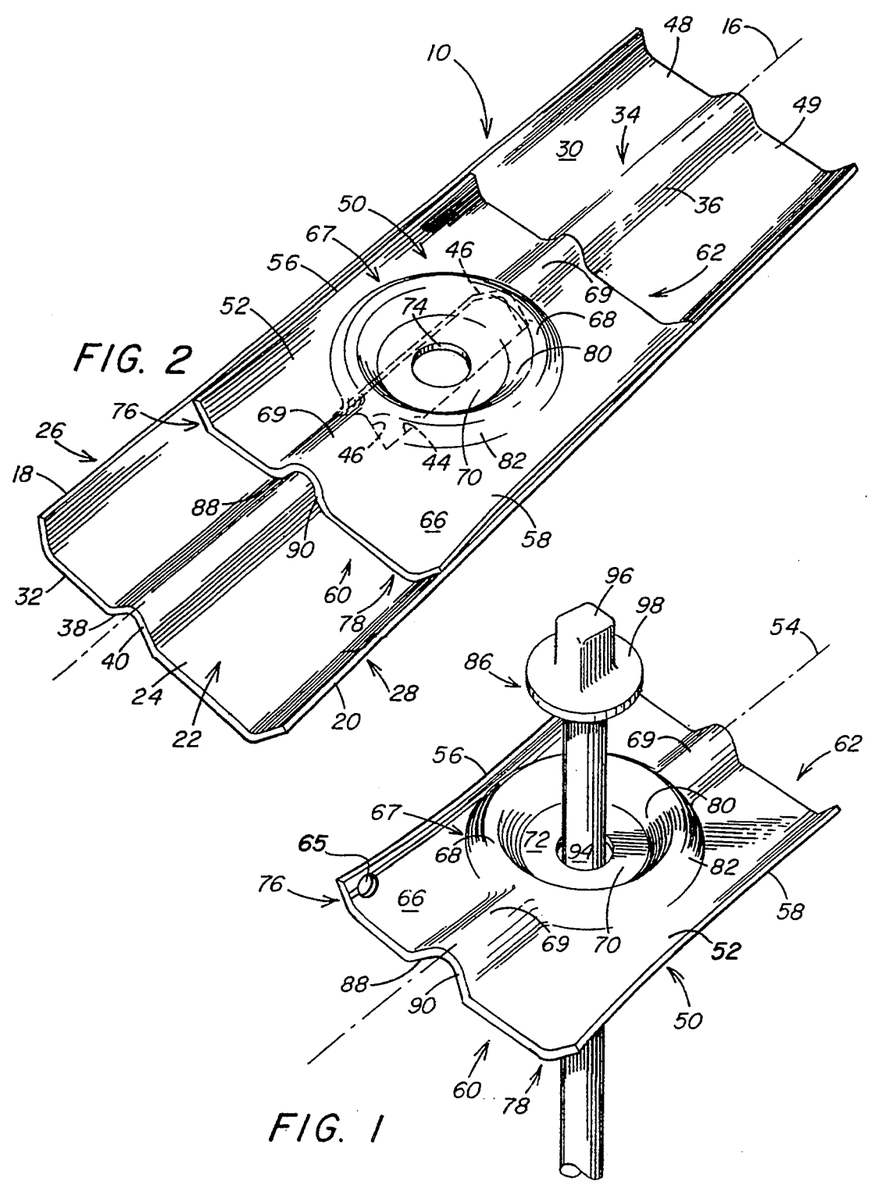
FIG. 1 is an isometric view of a bearing plate having circular and longitudinal embossments on the surface of the plate, illustrating an anchor bolt for securing the plate against a rock formation.
FIG. 2 is an isometric view of the bearing plate positioned in overlying abutting relation with a channel member, illustrating the center embossed area of the bearing plate overlying a longitudinal slot in a center rib of the channel member with planar portions of the bearing plate in contact with the planar portions of the channel member.
Figures 3, 4:
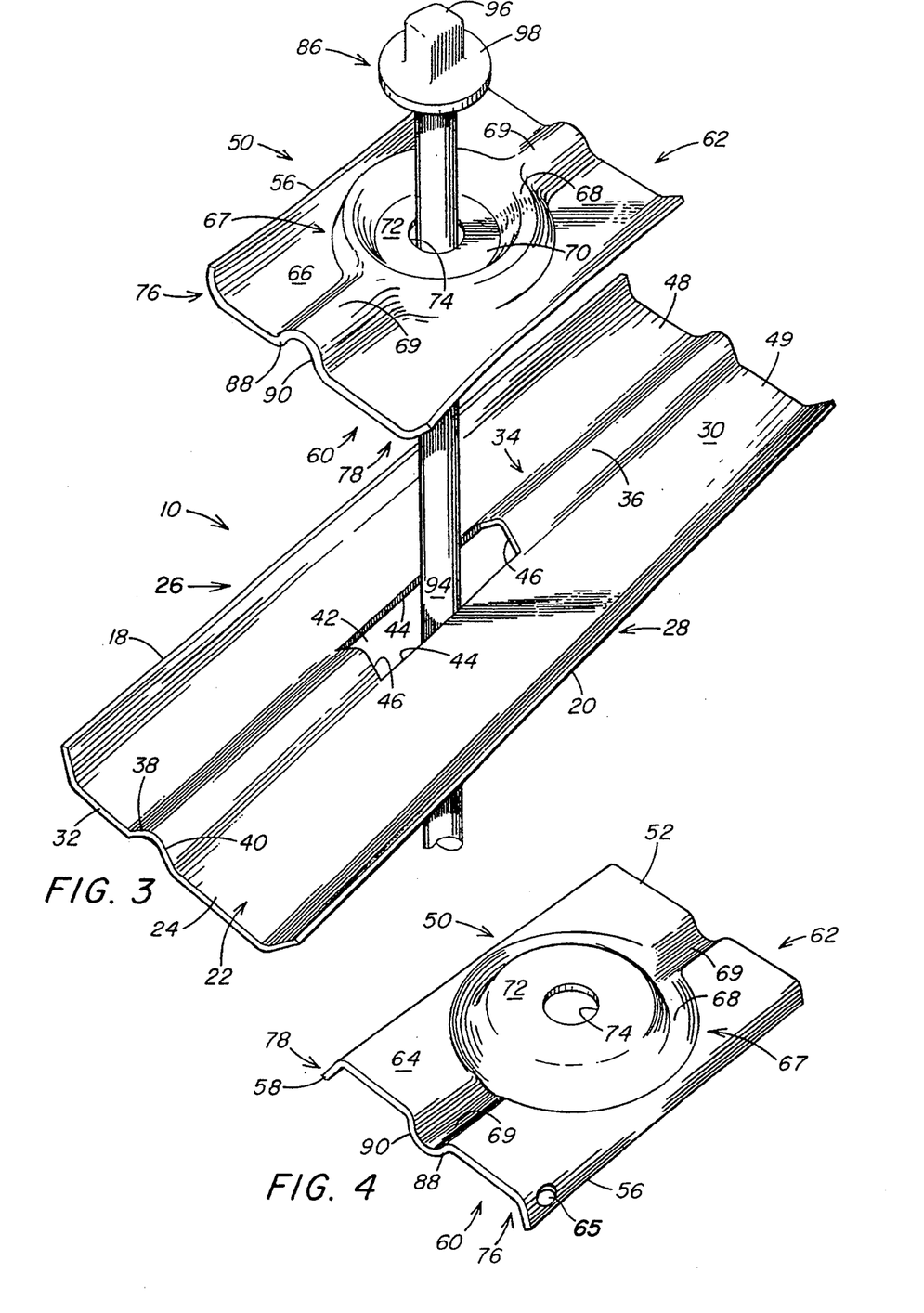
FIG. 3 is an isometric view of an assembly of an anchor bolt, bearing plate, and channel member for supporting a rock formation, illustrating the bearing plate having a reinforced configuration complementary with the reinforced configuration of the channel member.
FIG. 4 is a bottom isometric view of the bearing plate shown in FIG. 1.
Figure 8:
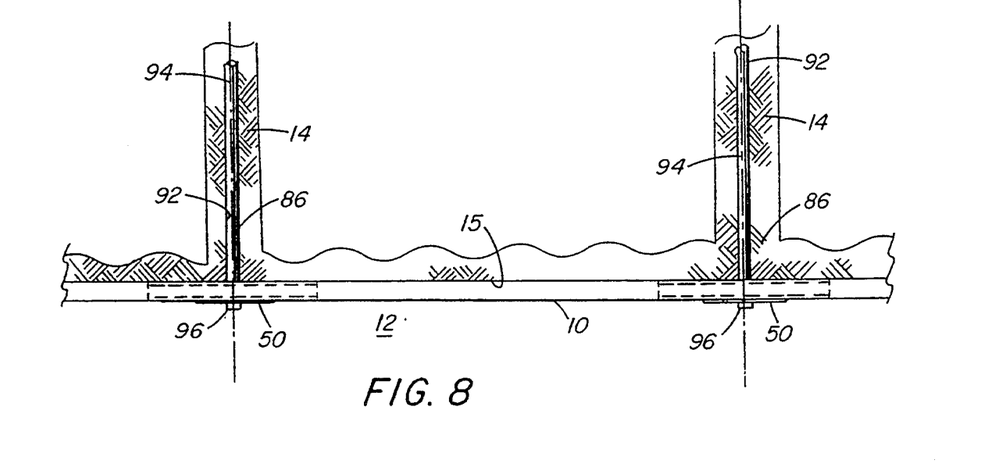
FIG. 8 is a schematic, fragmentary sectional view of a channel member secured by a pair of anchor bolts to a rock formation with bearing plates compressed by the bolts against the channel member.

Referring to the drawings and, particularly to FIGS. 1—3, there is illustrated an elongated structural support member generally designated by the numeral 10 for supporting an underground rock formation, such as a mine tunnel, passageway, or excavation formed during a material dislodging operation. A representative underground rock formation is illustrated in FIG. 8 in which a mine passageway 12 is cut in rock strata 14, forming a mine roof 15 and a pair of laterally spaced sidewalls and a mine floor (not shown).

As illustrated in the embodiment shown in FIGS. 2 and 3, the structural member 10 is a beam having an elongated channel-shaped configuration defined by a longitudinal axis 16 and reinforced by flanged edge portions and a longitudinal embossment. The structural member 10 can also be referred to as a roof mat.

Figure 9:
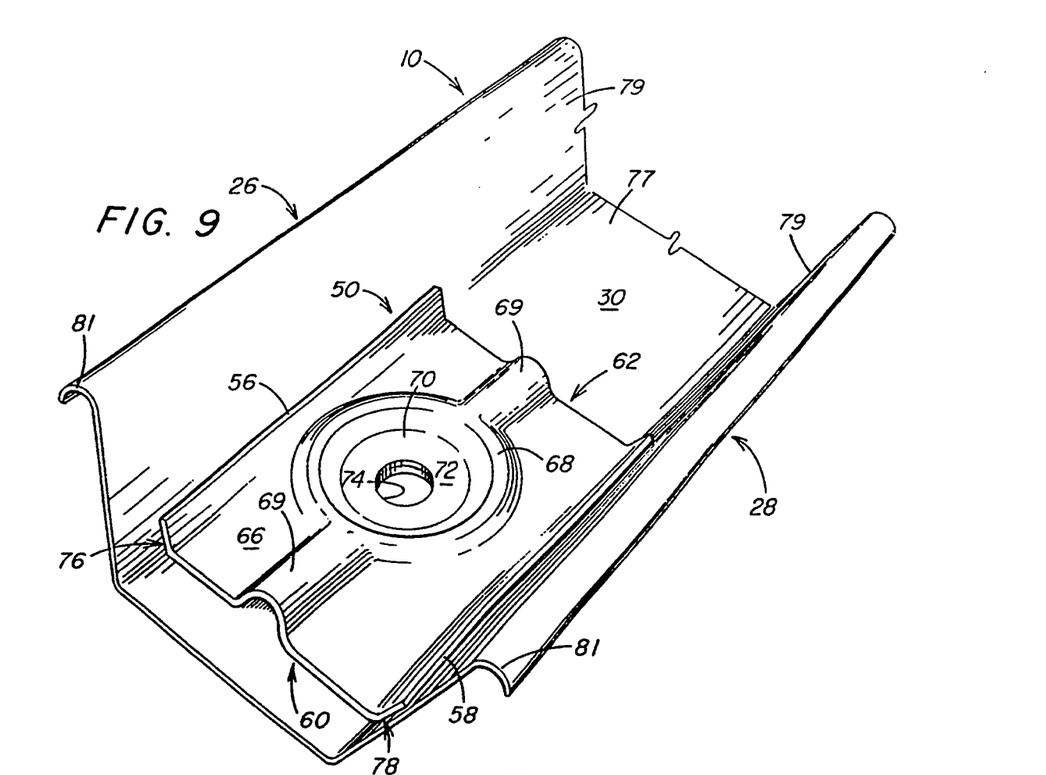
FIG. 9 is a fragmentary isometric view similar to FIG. 2 of an embossed bearing plate positioned on a U-shaped channel beam, illustrating the flanges of the bearing plate abutting the flanges of the channel beam.

The embodiment of the channel beam 10 shown in FIG. 9 has flanged edge portions of extended height with a flat base and no longitudinal embossment. The embossment of the channel beam 10 shown in FIG. 13 corresponds to that of FIG. 9 including a pair of longitudinal embossments. Therefore, it should be understood that the channel beam 10 of the present invention may include one or more longitudinal embossments or no embossments.

The embodiments of the channel beam 10 shown in FIGS. 9 and 13 will be discussed later in greater detail. The length of the channel member 10 is substantially greater than the width. Longitudinal edges 18 and 20 of the beam 10 are bent to stiffen the beam and form a channel generally designated by the numeral 22 in FIG. 2.

Preferably, the structural member 10 is a channel beam fabricated of metal, such as iron or steel or any other suitable material. In one example, the channel beam 10 is fabricated of galvanized steel and is supplied in a number of different lengths from 4 ½ feet up to 20 feet with a thickness of about 3/16 inch and having a yield strength of about 50,000 lb/in.

The structural member 10 illustrated in FIGS. 2 and 3 includes a base portion 24 extending the length of the member 10. Longitudinal edges 18 and 20 extend angularly a preselected height from the base portion 24 to form the generally U-shaped channel 22. Thus, the depth of the channel is selective as shown in FIGS. 2 and 9.

Figure 5:
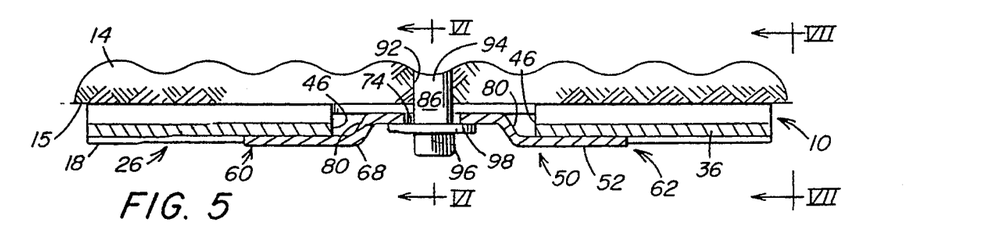
FIG. 5 is a fragmentary sectional view in side elevation of the assembled bearing plate and channel member shown in FIG. 3, illustrating the bolt anchored in the rock formation with the head of the bolt compressing the bearing plate against the channel member abutting the rock formation.
Figures 6, 7:
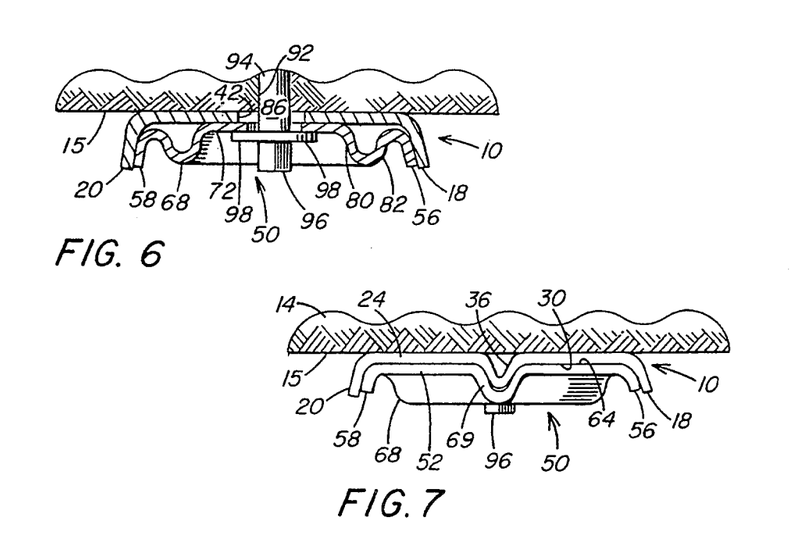
FIG. 6 is a sectional view taken along line VI—VI of FIG. 5, illustrating the reinforced surfaces of the bearing plate in contact with the reinforced surfaces of the channel member compressed by the anchored bolt against the rock formation.
FIG. 7 is an end view taken along line VII—VII of FIG. 5, illustrating the complementary surfaces of the bearing plate and channel member for securely positioning the bearing plate on the channel member to compress the channel member against the rock formation.

The longitudinal edges 18 and 20 of the channel beam 10 are formed integral with the base portion 24 to provide reinforcing flanges generally designated by the numerals 26 and 28. The reinforcing flanges 26 and 28 extend the length of the channel beam 10. The flanges 26 and 28 extend angularly from a planar surface 30 on one side of the base portion 24. The opposite side of the base portion 24 includes a bearing surface 32 for contacting the rock strata 14 as illustrated in FIGS. 5–7. The flanges 26 and 28 extend a preselected height from the planar surface 30. In FIG. 2, the flanges 26 and 28 are substantially shorter in height than the corresponding flanges on the channel beam 10 shown in FIG. 9.

The embodiment of the channel beam 10 shown in FIGS. 2, 3, 5 and 7 includes a reinforcing portion in the form of an embossment generally designated by the numeral 34 that extends the length of the base portion 24. Preferably, the embossment 34 is formed by stamping the beam 10 centrally on the planar surface 30 parallel to the flanges 26 and 28. The provision of the embossment 34 strengthens and stiffens the channel beam 10 to resist bending of the beam when it is anchored to a rock formation by anchor bolts.

The reinforcing portion or embossment 34 is formed in a preselected configuration. For example, as illustrated in FIG. 2 the embossment 34 has a generally inverted V-shaped configuration that forms a rib 36 extending the length of the channel beam 10. In FIG. 13, a pair of generally rounded embossments are formed on the channel beam. For the embodiment of the channel beam shown in FIG. 2, the height of the rib 36 is approximately equal to the height of the lateral flanges 26 and 28 to form the channel 22 between the center rib 36 and the lateral flanges 26 and 28. For the embodiment of the channel beam shown 10 in FIG. 13, the lateral flanges 26 and 28 are positioned a substantial height above the pair of ribs on the channel beam.

The V-shaped rib 36 on the channel beam 10 shown in FIG. 2 includes a pair of web sections 38 and 40 that are integrally formed to extend angularly with respect to the base portion 24. The web sections 38 and 40 are joined at an arcuate crown on the rib 36. It should be understood that the reinforcing portion 34 may be embossed on the channel member 10 in any desired configuration.

The reinforcing portion or rib 34 and the flanges 26 and 28 provide the elongated channel beam 10 with structural rigidity to resist bending and torsional forces applied by the rock strata 14 when installed as shown in FIG. 8. The configuration of the channel beam is selective based on the condition of the rock strata to be supported.

For general application in underground mine entries not presenting severe roof conditions, the channel beam 10 shown in FIG. 2 is more than satisfactory to provide roof support. For more unstable rock strata, as experienced in a headgate entry or a tailgate entry of a longwall mining operation, the embodiment of the channel beam 10 shown in FIG. 9 is preferred. The increased height of the reinforcing flanges 26 and 28 shown in FIG. 9 provides the channel beam 10 with greater resistance to bending and deflection.

The addition of longitudinal embossments, either a single rib (FIG. 2) or a pair of ribs (FIG. 13), to the channel beam further strengthens the beam to resist bending. Combining these factors with a choice of material and thickness for the beam enables the user to select a channel beam having the required strength for a particular roof support application. The user can avoid the problem of installing channel beams that exceed the strength and expense for what is really needed for a particular application.

The channel beam 10 includes a plurality of spaced apart openings 42. For purposes of illustration, only one opening 42 is shown in the channel beam 10 in FIGS. 2 and 3. However, it should be understood that regardless of the length of the channel member 10, a selected number of openings is spaced a preselected distance apart on the reinforcing portion 34. In the embodiment of the ribbed channel beam 10, as shown in FIGS. 2 and 3, the openings 42 have a length greater than a width to form a slot-like configuration. For channel beams having a base portion 24 with no longitudinal embossment, as shown in FIG. 9, circular openings (not shown) are used for receiving the anchor bolts.

As shown in FIG. 3, the openings or slots 42 are defined by opposite longitudinal side edges 44 positioned in the plane of the planar surface 30. Extending transversely between the ends of the side edges 44 are abutment walls 46 which extend in an inverted V-shape upwardly from the base portion 24. With this arrangement, an opening or a-slot 42 is formed in the longitudinally extending reinforcing rib 36. For the channel beam having a completely flat base portion, the openings 42 are circular in configuration with the area around each circular opening positioned in the plane of the base portion.

The angularly extending flanges 26 and 28 together with the V-shaped rib 36 form a pair of troughs 48 and 49 on the channel beam 10 shown in FIG. 3. The troughs 48 and 49, the central rib 36 and flanges 26 and 28 extend the length of the channel beam 10. This structure serves to stiffen the channel beam 10 to resist bending along its entire length.

As shown in FIG. 2, the planar surface 30 together with the lateral flanges 26 and 28 and the central rib 36 of the channel beam 10 form a receiving surface for a bearing plate generally designated by the numeral 50. The bearing plate 50 has a generally planar body portion 52 with a longitudinal axis 54, as shown in FIG. 1, defining longitudinal edges 56 and 58 and transverse edges 60 and 62. In the embodiment of the bearing plate 50 shown in FIG. 1, the longitudinal edges 56 and 58 are arcuately shaped to form flanges the length of the plate.

As shown in FIG. 4, the bearing plate 50 includes on one side a contact surface 64 for engaging the planar surface 30 of the channel beam 10. The bearing plate 50 includes on the opposite side an outer surface 66. As an added feature, the plate outer surface 66, as shown in FIGS. 1 and 4, includes an opening 65 punched through the plate flanged edge portion 76 to form a conventional hanger hole. The opening 65 is used to hang objects, such as brattice cloth, electrical wires, and other equipment in the mine, from the plate 50 at the mine roof 15. It should be understood that the bearing plate 50 is also used in one embodiment with a roof bolt assembly and without the channel beam 10, as shown in FIG. 1, to support an excavated rock formation. In this embodiment, the plate surface 64 is positioned in direct contact with the surface of the rock formation to be reinforced.

The bearing plate 50 includes an embossed area generally designated by the numeral 67 extending outwardly from the plate surface 66. The embossed area 67 includes a circular embossment 68 centered on the bearing plate 50 and a longitudinal embossment 69 extending outwardly from opposite sides of the circular embossment 68 on the plate longitudinal axis 54. The circular and longitudinal embossments 68 and 69 centrally and longitudinally rigidify the bearing plate 50 to resist bending and deflection. The circular embossment 68 includes a recessed portion 70 having a bottom wall 72 with a central opening 74 to form a donut-style embossment on plate 50.

Figure 14:
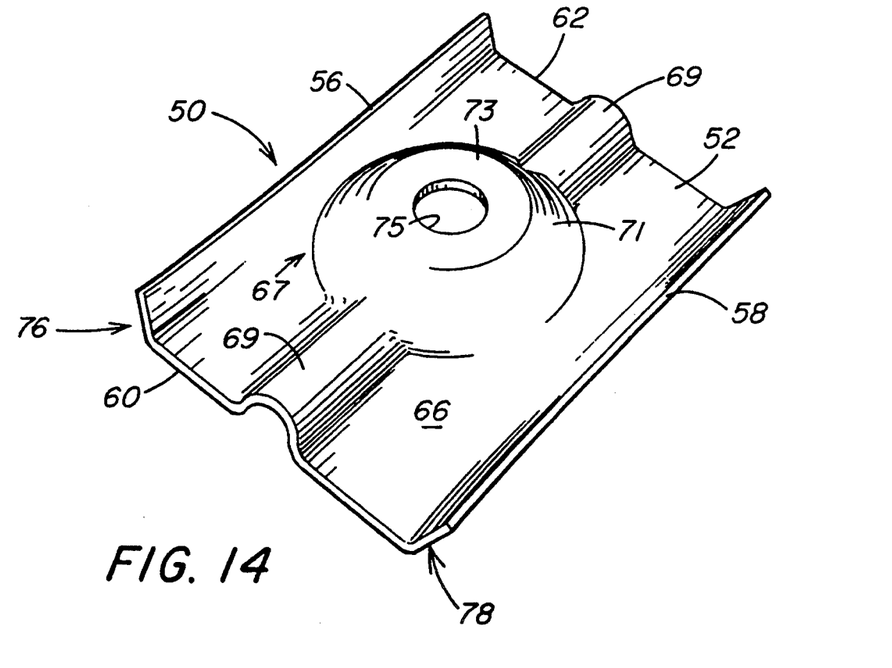
FIG. 14 is an isometric view of a bearing plate having a dome-shaped central embossment formed integral with a single longitudinal rib.
Figure 15:
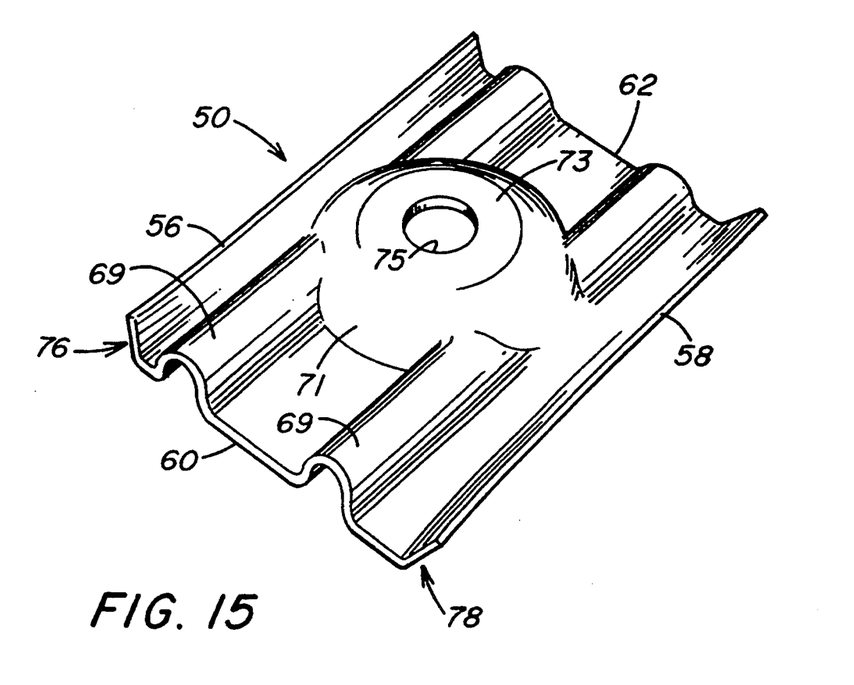
FIG. 15 is an isometric view of a bearing plate having a dome-shaped central embossment formed integral with a pair of longitudinal ribs.

FIGS. 14 and 15 illustrate additional embodiments of the bearing plate 50 in which like numerals shown in FIGS. 1 and 2 for the plate 50 refer to like parts shown in FIGS. 14 and 15. In FIG. 14, the embossed area 67 includes a circular embossment 71 centered on the plate body portion 52 and raised from the plate surface 66 in a dome configuration. The top of the embossment 71 includes a flat annular ring 73 raised above the plate surface 66. A central opening 75 extends through the ring 73. The annular ring 73 has a surface area sufficient to form a bearing surface to receive and support the head of an anchor bolt as shown in FIG. 1.

The dome-like circular embossment 71 extends substantially the complete width of the plate surface 66 to provide lateral reinforcement between the longitudinal flanges 76 and 78. Thus, the flanges 76 and 78 and the embossment 71 increase the structural strength of the plate 50, particularly in the central portion of the plate 50 around the opening 75. Additional reinforcement of the dome plate 50 is provided by the longitudinal embossment 69 that extends from opposed sides of the center embossment 71 on the longitudinal axis of the plate 50. The longitudinal embossment 69 combines with the dome-shaped embossment 71 and the plate flanges 76 and 78 to provide a bearing plate with enhanced rigidity to resist bending and deformation along its longitudinal and transverse axes.

A further embodiment of a dome-style bearing plate 50 is illustrated in FIG. 15 in which a pair of longitudinally extending embossments 69 are formed integral with circular embossment 71. The embossments 69 extend from plate transverse edge 60 to plate transverse edge 62. The embossments 69 are offset from the plate longitudinal axis and are positioned in spaced parallel relation to the side edge flanges 76 and 78. This arrangement of utilizing a pair of longitudinal embossments 69 substantially rigidifies the bearing plate 50 along its length.

Figure 11:
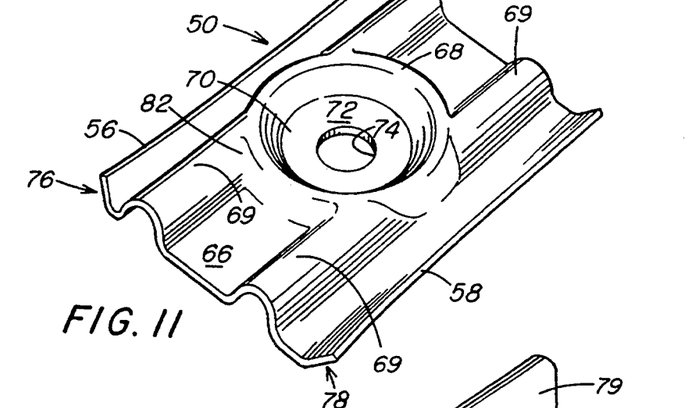
FIG. 11 is an isometric view of a bearing plate having a pair of rib embossments formed integral with a central embossment and reinforced flanged edge portions.

The embodiment of the bearing plate 50 shown in FIG. 11 having a donut-style circular embossment 68 includes a pair of longitudinally extending embossments 69. The longitudinal embossments 69 are formed integral with the circular embossment 68 and extend the length of the plate 50. It should be understood that each of the embodiments of the bearing plate 50 shown in FIGS. 1, 11, 14 and 15 are used alone with anchor bolts or in combination with an anchor bolt and an elongated structural support member, such as the channel beam 10, to support a rock formation. The embossed bearing plate 50 of the present invention is substantially stronger than a conventional 4"×4" or 6"×6" bearing plate and when used in combination with a channel beam increases the effectiveness of the channel beam to support an excavated rock formation.

As shown in FIG. 1, the bearing plate longitudinal edges 56 and 58 extend angularly from the outer surface 66 of the plate body portion 52 to form the flanges or ribs generally designated by the numerals 76 and 78. The ribs 76 and 78 provide the bearing plate 50 with a channel configuration also strengthened by the embossments 68 and 69. The ribs 76 and 78 also serve to stiffen the plate longitudinal edges 56 and 58 to resist bending. The arcuate configuration of the longitudinal edges 56 and 58 also adds rigidity to the plate 50. Therefore, the bearing plate 50 has an overall reinforced structure effective to support a rock formation alone without the addition of the channel beam 10.

As seen in FIGS. 2, 7, 9 and 13 the channel beam 10 and bearing plate 50 have complementary transverse profiles. This permits the bearing plate 50 to be positioned in overlying abutting relation with the channel beam 10 around the opening 42 in the channel beam 10. The overlying abutting relation of the bearing plate 50 with the channel beam 10 forms a composite reinforced channel assembly.

The bearing plate 50 has a generally rectangular, channel-like configuration defined by the longitudinal edges 56 and 58 and the transverse edges 60 and 62. The width of the bearing plate 50 corresponds to the width of the channel beam 10 so that the bearing plate 50 is received on the channel beam 10 with the plate longitudinal flanges 76 and 78 bearing against the channel beam flanges 26 and 28. This relationship is shown for the various embodiments of the plates 50 and channel beams 10 in FIGS. 2, 7, 10, 12 and 13. Contact of the plate flanges 76 and 78 with the channel beam flanges 26 and 28 restrains lateral movement of the bearing plate 50 on the channel beam 10.

As shown in FIG. 1, the bearing plate flanges 76 and 78 extend outwardly from the plate outer surface 66 at an angle substantially corresponding to the angle formed by each of the channel beam flanges 26 and 28 with the planar surface 30. In one example, the bearing plate 50 has a width of about 5 inches extending between the longitudinal edges 56 and 58. The length of the bearing plate 50 is also selective, for example about 6 to 7 inches.

Preferably, the bearing plate 50 has a minimum length which exceeds the length of the elongated opening 42 in the channel member 10, as shown in FIG. 3. In one example, the opening 42 has a length of about 3.5 inches, and the bearing plate 50 has a nominal length of about 6 inches. In another example, the opening 42 is circular corresponding to the diameter of the circular opening in the bearing plate 50 shown in FIG. 1.

Regardless of the configuration of the opening 42 in the channel beam 10, the bearing plate 50 has a length which provides substantial contact of the bearing plate surface 64 with the channel beam planar surface 30, including the abutting contact of the plate flanges 76 and 78 with the beam flanges 26 and 28. As will be explained later in greater detail, the overlying contact of the bearing plate 50 with the channel beam 10 increases the compressive forces applied by the channel beam 10 to the rock strata 14. Also, the reinforced bearing plate 50 takes up or absorbs the forces applied to the channel beam 10 by the anchor bolt to eliminate stress concentration around the opening 74.

The reinforced bearing plate 50 also prevents deflection of the area around the opening 42 in the channel beam 10 upon tightening of the anchor bolt. The reinforced structure of the bearing plate 50 absorbs the forces applied to the channel beam 10 by the anchor bolt and distributes the forces over a wide area of the channel beam 10. The compressive forces are not concentrated at the areas of the plate and channel beam around the respective openings. The forces applied by the anchor bolt are distributed over a wider area of the channel beam 10 as the anchor bolt is tightened. This increases the effectiveness of the channel beam 10 to support the rock formation.

As the torque applied to the anchor bolt increases, the bearing plate 50 seats on the channel beam 10. The area of contact of the plate 50 with the beam 10 increases as torque is applied to the anchor bolt. The greater the area of contact of the plate 50 with the beam 10, the greater the compressive forces applied by the beam 10 to the rock formation. Therefore, the effectiveness of the channel beam 10 to support a rock formation is enhanced by increasing the forces applied to the bearing plates 50 upon tightening of the anchor bolts in the rock formation. The support provided by the channel beam 10 becomes stronger with load applied to the bearing plates 50.

As seen in FIGS. 2 and 7, the bearing plate contact surface 64 extends from the circular embossment 68 into overlying relation with the channel central rib 36 and the planar surface 30 of the channel beam 10 around the opening 42 in the rib 36. The bearing plate circular embossment 68 includes the bottom wall 72, as shown in FIG. 4, which has a diameter less than the length of the slotted opening 42 in the beam channel rib 36. In the case of circular opening 42, a planar surface 30 of the channel beam 10 between the embossments 36 receives the plate bottom wall 72. As shown in FIGS. 5 and 6, the plate bottom wall 72 is supported on the channel planar surface 30 opposite the opening 42. A portion of the bottom wall 72 spans the slot 42 with the outer portions of the bottom wall 72 in contact with the surface 30 around the opening 42.

The bearing plate circular embossment 68, as seen in FIGS. 1 and 6, includes a curved inner leg 80 and a curved outer leg 82 that merge to form an arcuate top portion 84. As seen in FIG. 5, the inner leg 80 extends to the plate bottom wall 72 and is positioned oppositely of the slot abutment walls 46 of the channel beam 10. Thus, longitudinal movement of the bearing plate 50 on the channel beam 10 is restrained by contact of the circular embossment inner legs 80 with the slot abutment walls 46.

When the bearing plate 50 is used to reinforce the channel beam 10, as shown in FIG. 2, the plate bottom wall 72 and the recessed portion 70 are positioned in overlying relation with the channel opening 42. The bearing plate opening 74 overlies the channel opening 42. A limited amount of longitudinal movement of the bearing plate 50 on the channel member 10 is permitted before the embossment inner legs 80 contact either one of the adjacent channel abutment walls 46. Also, the width of the channel slot 42 exceeds the diameter of the plate central opening 74 to permit unobstructed passage of an anchor bolt 86 through the aligned openings 42 and 74, as shown in FIG. 3.

Figure 10:
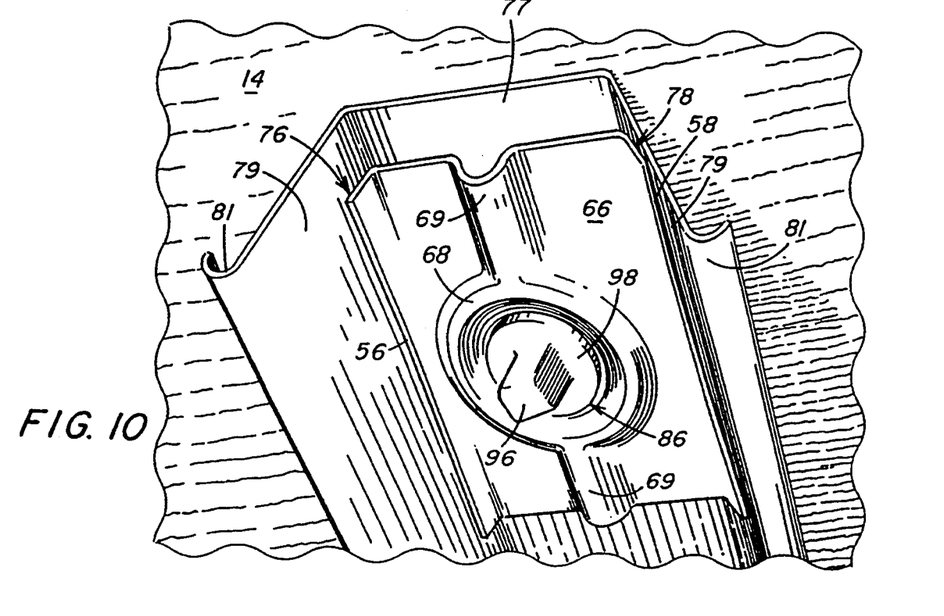
FIG. 10 is a fragmentary schematic isometric view of the bearing plate and channel beam shown in FIG. 9 anchored by a roof bolt to a rock formation.
Figure 12:
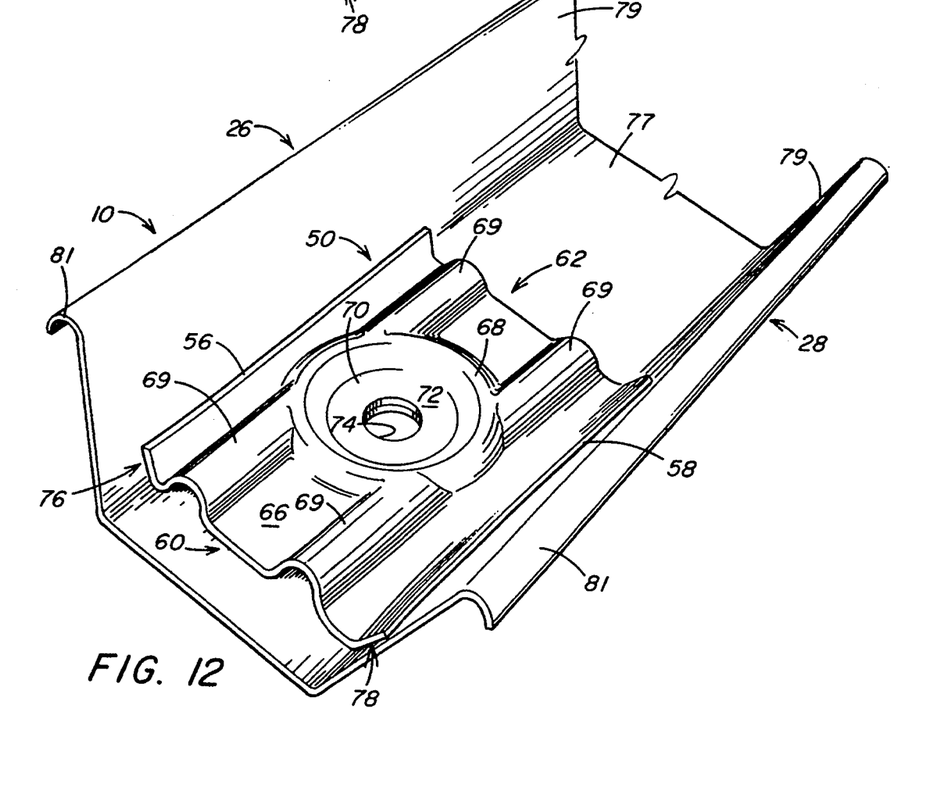
FIG. 12 is a fragmentary isometric view of the bearing plate shown in FIG. 11 positioned on a U-shaped channel beam.
Figure 13:
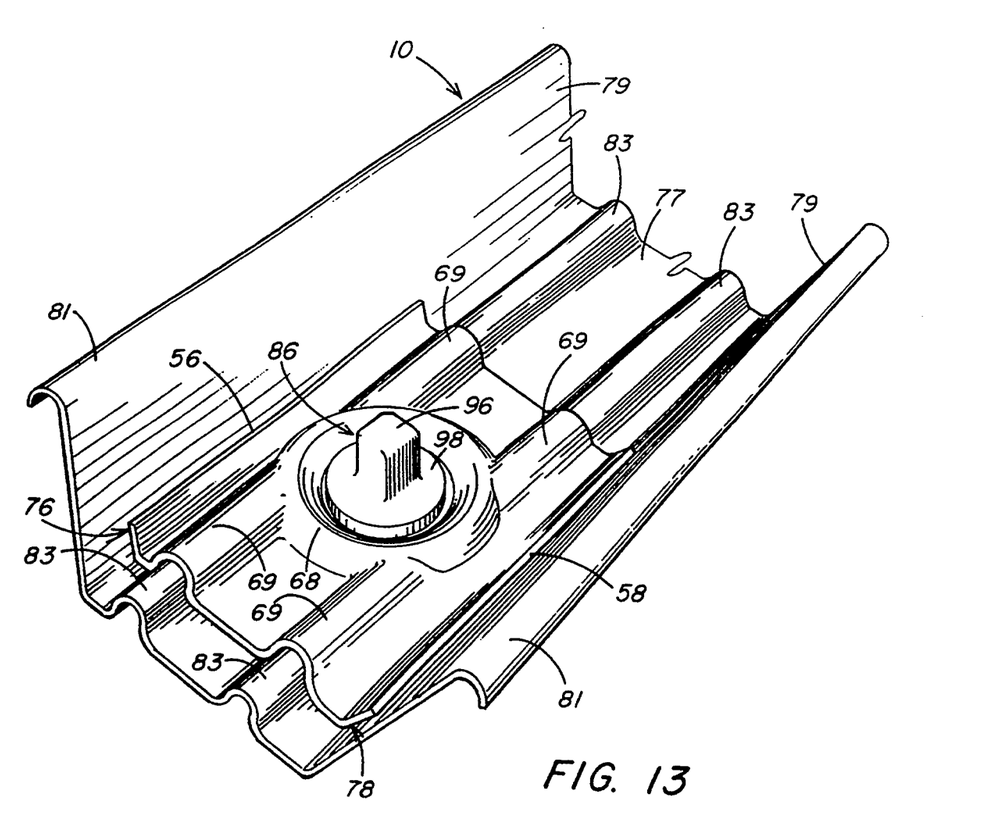
FIG. 13 is a fragmentary isometric view of the bearing plate shown in FIG. 11, illustrating a roof bolt compressing the bearing plate against a U-shaped channel beam having a pair of longitudinal rib embossments for receiving the pair of rib embossments of the plate.

In the embodiments of the channel beam 10 shown in FIGS. 10, 12 and 13, a circular or an elongated opening 42 is used. The plate opening 74 is aligned with the channel opening 42. The plate bottom wall 72 then seats on the flat surface of the channel beam around the opening 42.

The longitudinal embossment 69, shown in FIG. 1, of the bearing plate 50 extends diametrically from opposed sides of the circular embossment 68. The longitudinal embossment 69 is aligned with the longitudinal axis 54 of the bearing plate 50. The plate longitudinal embossment 69 has a configuration complementary with the configuration of the longitudinal embossment or rib 36 of the channel beam 10. Therefore, the plate embossment 69 overlies in abutting relation the channel rib 36, as seen in FIGS. 2 and 7.

The plate longitudinal embossment 69 extends from the circular embossment 68 the length of the plate 50. Thus, the longitudinal embossment 69 rigidifies and strengthens the plate 50 to resist deformation and bending along the axis 54 of the plate 50. Also, as seen in FIGS. 1, 6, 11, 14 and 15, the plate circular embossment 68 extends substantially the width of the bearing plate 50. The circumferential edge of the circular embossment 68 extends closely adjacent to the longitudinal flanges 76 and 78.

With the circular embossment 68 extending the width of the plate 50, the plate 50 is reinforced to resist deformation and bending along its transverse axis. The circular and longitudinal embossments 68 and 69 of the plate 50 combine to provide the bearing plate 50 with enhanced rigidity to reinforce a channel beam as shown in FIGS. 5-8, 10, 12 and 13 or when used alone as shown in FIG. 1 to contact a mine roof when compressed against the roof surface by a roof bolt assembly anchored in the mine roof.

Similar in construction to the channel rib 36, the plate longitudinal embossment 69 as shown in FIGS. 1, 3 and 4 includes a pair of web sections 88 and 90 that are integral with and extend angularly with respect to the plate body portion 50. The web sections 89 and 90 are joined to form an arcuate crown which is positioned at the elevation of the crown or top portion 84 of the plate circular embossment 68. The web sections 89 and 90 extend from the plate surface 66 at approximately the same angle which the channel web portions 38 and 40 extend from the channel surface 30. This arrangement permits the longitudinal embossment 69 of the plate 50 to overly in abutting complementary relationship the channel rib 36.

The longitudinal embossments 36 and 69 for the channel beam 10 and the bearing plate 50 provide added strength for these members. Then when the members are positioned in overlying abutting relation and secured to a rock formation by an anchor bolt, the combined members provide substantially greater support of the rock formation than attainable with conventional bearing plates and channel members. In addition, the abutting contact of the plate longitudinal embossment 69 with the channel rib 36 resists lateral movement of the bearing plate 50 on the channel member 10 so that when the anchor bolt is tightened on installation, the plate 50 will not turn on the channel beam 10.

The bearing plate 50 is further restrained from moving laterally on the channel member 10 by the abutting relation of the plate flanges 76 and 78 with the channel member flanges 26 and 28. This relationship is clearly shown for the embodiment of the plate and channel beam in FIG. 2 and the embodiments shown in FIGS. 10, 12 and 13. The plate flanges 76 and 78 have an arcuate configuration corresponding in part to the shape of the channel beam flanges 26 and 28. This permits the flanges 76 and 78 to overlie the flanges 26 and 28 and increase the area of contact of the plate 50 with the channel beam 10.

The bearing plate 50 shown in FIGS. 1-4 is provided with a width which allows the plate 50 to be received between the channel edges 18 and 20. The plate edges 56 and 58 extend approximately at the same angle from the plate surface 66 that the channel edges 18 and 20 extend from the channel surface 30. Preferably, the edges 18, 20 and 56, 58 extend at an angle greater than 90° from the respective planar surfaces 30 and 66.

The overlapping abutting relation of the flanged edges of the bearing plate 50 and channel beam 10 is also clearly illustrated in FIGS. 6 and 7. The circular and longitudinal embossments 68 and 69 and the flanges 76 and 78 rigidify or stiffen the bearing plate 50 to resist bending. They also provide means for engaging the bearing plate 50 to the channel beam 10 in a position where the bearing plate 50 is restrained from both longitudinal and lateral movement on the channel beam 10. This serves to maintain the central opening 74 of the bearing plate 50 in alignment with the opening 42 of channel beam 10.

With the present invention, the area of contact of the bearing plate 50 with the channel beam 10 is increased. The compressive forces applied by the bearing plate to the channel beam are distributed over a substantial area of the channel beam and are not concentrated at the area of the channel beam around the opening 42 in the beam. This prevents deflection of the plate and beam around the aligned holes by the load applied by the bolt head when the anchor bolt is installed. With conventional plates and channels tightening the bolt tends to draw the plate into the channel due to the concentration of forces by the bolt around the openings in the plate and beam. In some installations, tightening the bolt head draws the plate through the channel, or the bolt head is drawn through both the plate and the channel.

The planar portions of the bearing plate 50 between the circular and longitudinal embossments 68 and 69 and the lateral flanges 26 and 28 form channel portions which extend into overlying abutting relation with corresponding channel portions 48 and 49 of the channel member 10. As seen in FIG. 4, the contact surface 64 on the bottom of the plate 50 provides a substantial bearing surface for engagement with the surface 30 of the beam 10 within the channel portions 48 and 49.

The plate contact surface 64 applies compressive forces to an expanded area of the channel beam around the opening 42 in the beam. This permits the concentrated forces applied by the anchor bolt to be distributed over the reinforced body portion of the plate 50 and applied to a greater surface area of the channel beam 10 as opposed to only the area of the channel beam 10 immediately around the opening 42. Distribution of the compressive forces over a greater area of the channel beam, in turn, increases the compressive forces applied by the channel beam to the rock formation. This provides substantially increased support of the rock formation by the channel beam 10. Accordingly, the greater the load applied by the anchor bolt to the bearing plate 50, the greater the compressive forces applied by the channel beam 10 to the rock formation.

Initially upon installation, the bearing plate 50 and the channel beam 10 are positioned in overlying, abutting relation with the channel beam 10 positioned in contact with the rock strata 14 as shown in FIGS. 5-7. The anchor bolt 86 is extended through the aligned openings 74 and 42 into a bore hole 92 drilled in the rock formation 14. The anchor bolt 86 is conventional in design and includes an elongated shank 94 having at one end an integral bolt head 96 and washer 98 and at an opposite end a conventional mechanical expansion assembly (not shown) positioned within the bore hole 92. Conventional, resinous bonding material may also be utilized in the bore hole 92 to secure the anchor bolt 86 to the rock strata.

With the bearing plate 50 abutting the channel beam 10 engaging the surface of the rock strata around the bore hole 92, rotation of the anchor bolt 86 expands the expansion shell assembly into gripping engagement With the wall of the bore hole. This places the bolt 86 in tension so that the layers of the rock strata are compressed together. Continued rotation of the anchored bolt 86 compresses the bearing plate 50 against the channel beam 10.

The compressive forces are transmitted over the surface of the bearing plate 50 to increase the compressive force applied by the channel beam 10 to the rock strata 14. The bearing plate 50 is securely maintained in position on the channel member 10 and is restrained from turning upon tightening of the anchor bolt. Both the bearing plate 50 and the channel beam 10 are reinforced to resist bending and deflection under the load of the rock strata, as above described. Thus, the reinforced construction of the bearing plate 50 and the channel beam 10 in accordance with the present invention strengthens the plate and beam for enhanced compression of the rock strata upon installation. Then once installed, the reinforced construction of the plate and beam serves to withstand the overhead pressures exerted by the rock strata and maintains the strata in place.

As seen in FIGS. 5 and 6, when the bolt 86 is anchored within the bore hole 92, the washer 98 on the bolt head 96 is compressed against the bottom wall 72 of the bearing plate 50 around the hole 74. In the case of the dome-style bearing plate 50 shown in FIG. 14 and 15, the washer 98 on the bolt head 96 seats on the raised, flat ring portion or bearing surface 73 of the dome embossment 71. The washer 98 prevents the bolt 86 from passing through the bearing plate 50. Also, other devices can be used to anchor the bolt 86 in the bore hole. For example, a resin system may be utilized to secure the bolt 86 in the bore hole 92 by bonding of the bolt 86 to the rock strata surrounding the bore hole 92. Also as well known in the art, a combination expansion shell assembly and resin system can be used to anchor the bolt in the bore hole.

Conventionally, the bore holes 92 are drilled in the rock strata as a part of the primary mining cycle in the formation of the underground or mine passageway. As the mine passageway is being formed, the channel beams 10 and the bearing plates 50 or the bearing plates 50 alone are installed to support the rock strata. Conventionally, the channel beams 10 are installed to extend transversely across the mine roof between the lateral sidewalls or parallel to the sidewalls of the mine passageway. The channel members may also be installed to extend vertically on the sidewalls between the mine roof and floor.

The channel beams 10 are provided in accordance with the present invention in a number of different lengths that vary from about 4.5 feet to 20 feet. Regardless of the length of the channel beam 10, the openings 42 are located a preselected distance apart to correspond to the required bolt plan. The channel beams 10 are also provided in a range of gauges, for example, from 7 to 16 gauge galvanized steel.

The embodiment of the channel beam 10 shown in FIGS. 9, 10, 12 has a deeper trough 77 than the troughs 48, 49 for the channel beam 10 shown in FIGS. 2 and 3. The deep trough 77 is formed by upwardly extending side walls 79 that connect arcuate flange edges 81 with the beam planar surface 30. The side walls 79 extend from the planar surface 30 at the same angle the bearing plate edges 56 and 58 extend from the plate surface 66. The extended side walls 79 of the beam 10 serve to provide increased rigidity of the beam to resist bending.

The width of the bearing plate 50, as shown in FIG. 9, corresponds to the width of the trough 77 so that the plate edges 56 and 58 abut the channel beam side walls 79. The bearing plate 50 and the channel beam 10 are secured to a rock formation 14, as shown in FIG. 10, by the anchor bolt 86. The plate 50 is compressed against the beam surface 30 in the trough 77 with the plate edges 56 and 58 abutting and compressed against the beam side walls 79.

A substantial area of the plate 50 is compressed against the beam surface to increase the compressive forces applied by the beam 10 to the rock formation 14. The bearing plate 50 is effectively restrained from turning in the trough 77 upon tightening the anchor bolt 86. This serves to distribute the load applied by the bolt 86 to the bearing plate 50 over a wider area of the channel beam 10.

To further rigidify the bearing plate 50, a pair of longitudinally extending embossments 69 are provided on another embodiment of the bearing plate 50 as shown in FIGS. 11–13. The embossments 69 are offset from the longitudinal axis of the bearing plate 50 and are formed integral with the circular embossment 68 having the recessed bottom wall 72. As discussed above, the dome-style bearing plate 50 shown in FIG. 15 also includes the pair of longitudinally extending embossments or ribs 69.

The pair of ribs 69 on the bearing plate 50 shown in FIGS. 11–13 extend in spaced parallel relation to the plate flanges 76 and 78 and extend upwardly from the plate surface 66 to about the height of the flange edges 56 and 58. The embodiment of the bearing plate 50 shown in FIG. 11 can be used alone with an anchor bolt 86 to support a rock formation or in combination with a channel beam of the type shown in FIG. 12 having a planar surface 30 without a longitudinal embossment on the beam.

In an alternative embodiment as shown in FIG. 13, channel beam 10 includes a pair of longitudinally extending embossments or ribs 83 extending the length of the trough 77. The ribs 83 are positioned on the channel beam 10 to receive the pair of longitudinal ribs 69 of the bearing plate 50. The ribs 69 and 83 have complementary shapes so that the plate ribs 69 overlie and engage the beam ribs 83.

The multiplicity of ribs on the bearing plate 50 and channel beam 10 shown in FIG. 13 add further strength to the members to resist bending upon installation by the anchor bolt 86. Once installed, the ribbed structure of the bearing plate and channel beam is particularly effective to support a rock formation that includes unstable strata.

Referring to FIG. 8, there is illustrated a continuous length of channel beam 10 having at least two openings 42 spaced a preselected distance apart for receiving anchor bolts 86 to be secured in bore holes 92 drilled in the rock strata 14. The elongated configuration of the channel openings 42 facilitates efficient alignment of the openings 42 with predrilled bore holes 92. Because of the extended length of the channel beam 10, it is subject to deflection and bending under the load of the rock strata 14. The provision of the reinforced structure of the channel beam 10, as above described, and installation of the bearing plates 50 having a reinforced configuration complementary with the configuration of the channel beam 10 serves to stiffen the channel member 10 to resist bending and deflection.

The provision of the reinforced bearing plate 50 in combination with the reinforced channel beam 10 provides a support system in which the compressive forces applied by the channel beam to the rock formation increase with the load applied to the bearing plate 50 upon tightening of the anchor bolt. The bearing plate and the channel beam operate as a system to provide increased support of the rock formation by the channel beam.

According to the provisions of the patent statutes, we have explained the principle, preferred construction, and mode of operation of our invention and have illustrated and described what we now consider to represent its best embodiments. However, it should be understood that within the scope of the appending claims the invention may be practiced otherwise than as specifically illustrated and described.

We claim:

1. Apparatus for supporting a rock formation comprising,
   an elongated member having a base portion with a length substantially greater than a width defining longitudinal edges forming a channel therebetween,
   said base portion having a bearing surface for contacting the rock formation and an opposite surface,
   at least one opening extending through said elongated member base portion,
   a bearing plate including a contact surface and an outer surface, said contact surface positioned in overlying abutting relation with said elongated member opposite surface,
   an embossed area extending outwardly from said plate outer surface and having a central opening therethrough,
   said plate central opening aligned with said elongated member opening,
   said embossed area extending on said bearing plate outwardly from said bearing plate central opening,
   said plate embossed area positioned in overlying relation with said elongated member base portion opposite surface for reinforcing said elongated member, and
   anchor means extending through said aligned openings into the rock formation and bearing against said plate embossed area for urging said bearing plate into compressive engagement with said elongated member to reinforce said elongated member compressed against the rock formation to support the rock formation.

2. Apparatus for supporting a rock formation as set forth in claim 1 which includes,
   means for reinforcing said elongated member extending the length of said base portion within said channel.

3. Apparatus for supporting a rock formation as set forth in claim 2 in which,
   said means for reinforcing said elongated member includes a longitudinally extending embossment positioned on said opposite surface within said channel.

4. Apparatus for supporting a rock formation as set forth in claim 3 which includes,
   said bearing plate embossed area having a configuration complementary with the configuration of said longitudinally extending embossment in said channel to overlie said channel embossment for uniform distribution of the compressive forces from said bearing plate to said elongated member upon installation of said anchor means.

5. Apparatus for supporting a rock formation as set forth in claim 2 in which,
   said means for reinforcing said elongated member includes a plurality of longitudinally extending embossments positioned in spaced parallel relation on said opposite surface within said channel.

6. Apparatus for supporting a rock formation as set forth in claim 5 which includes,
   said bearing plate embossed area having a configuration complementary with the configuration of said plurality of longitudinally extending embossments in said channel to overlie said channel embossments for uniform distribution of the compressive forces from said bearing plate to said elongated member upon installation of said anchor means.

7. Apparatus for supporting a rock formation as set forth in claim 1 which includes,
   means for restraining movement of said bearing plate on said elongated member.

8. Apparatus for supporting a rock formation as set forth in claim 7 in which,
   said means for restraining movement of said bearing plate includes said plate embossed area having a recessed portion with a bottom wall surrounding said central opening, and
   said recessed portion bottom wall positioned in said elongated member opening with said recessed portion positioned adjacent to said elongated member base portion to restrain longitudinal movement of said bearing plate on said elongated member.

9. Apparatus for supporting a rock formation as set forth in claim 7 in which,
   said means for restraining movement of said bearing plate includes said elongated member longitudinal edges spaced a selected distance apart, and
   said bearing plate having a pair of longitudinal edges spaced a distance apart for positioning in abutting relation with said elongated member longitudinal edges to prevent lateral movement of said bearing plate within said channel.

10. Apparatus for supporting a rock formation as set forth in claim 7 in which,
    said means for restraining movement of said bearing plate includes an embossment positioned on said elongated member within said channel, and
    said bearing plate embossed area having a portion complementary in configuration with said elongated member embossment for engagement therewith to restrain lateral movement of said bearing plate on said elongated member.

11. Apparatus for supporting a rock formation as set forth in claim 1 which includes,
    a central rib embossed on said elongated member base portion and extending the length of said channel,
    a plurality of openings extending through said rib and spaced a preselected distance apart, and
    said openings each having a configuration of a slot with a width equal to the width of said central rib and extending a preselected length along said central rib.

12. Apparatus for supporting a rock formation as set forth in claim 1 which includes,
    a rib extending longitudinally and positioned centrally in said elongated member channel,
    said bearing plate embossed area includes a circular embossed portion and a longitudinal embossed portion extending from opposed sides of said circular embossed portion, and
    said longitudinal embossed portion having a configuration complementary with the configuration of said rib to overlie said rib for uniform distribution of the compressive forces applied by said anchor means from said bearing plate to said elongated member.

13. Apparatus for supporting a rock formation as set forth in claim 1 in which,
said elongated member and said bearing plate have complementary transverse profiles positioned in overlying abutting relation to form a composite channel assembly.

14. A bearing plate comprising,
a planar body portion having a longitudinal axis defining planar longitudinal edges and planar transverse edges,
a contact surface for engaging a generally planar surface on one side of said body portion and an outer surface on an opposite side of said body portion,
an embossment extending outwardly from said body portion outer surface,
said embossment including a central embossed area and a longitudinally extending embossed area formed integral with said central embossed area on said body portion,
said central and longitudinally extending embossed areas rigidify said body portion to resist deflection,
said central embossed area including a central opening extending therethrough, and
said longitudinal edges extending angularly from said body portion outer surface to form flanges for stiffening said longitudinal edges to resist bending.

15. A bearing plate as set forth in claim 14 in which,
said central embossed area has a circular configuration extending transversely substantially the width of said plate body portion between said longitudinal edges.

16. A bearing plate as set forth in claim 15 in which,
said central embossed area includes a recessed portion having a bottom wall with said central opening extending therethrough.

17. A bearing plate as set forth in claim 15 in which,
said central embossed area includes a portion raised from said body portion outer surface in a dome-type configuration with said central opening extending through said raised portion above said outer surface.

18. A bearing plate as set forth in claim 14 in which,
said longitudinally extending embossed area includes an embossment extending outwardly from opposite sides of said central embossed area on said body portion longitudinal axis.

19. A bearing plate as set forth in claim 14 in which,
said longitudinally extending embossed area includes a pair of embossments offset from said body portion longitudinal axis and extending from opposite sides of said central embossed area in spaced relation to said body portion longitudinal edges.

20. A bearing plate as set forth in claim 14 in which,
said longitudinally extending embossed area includes a reinforcing rib extending from said central embossed area the length of said body portion.

21. A bearing plate as set forth in claim 14 which includes,
channel portions on said body portion outer surface between said central embossed area and said longitudinally extending embossed area and said body portion longitudinal edges.

22. A method for supporting a rock formation comprising the steps of,
positioning an elongated channel member in contact with a surface of a rock formation,
reinforcing longitudinal edges of the channel member to stiffen the channel member to resist bending,
positioning openings in the channel member in spaced relation along the longitudinal length of the channel member,
positioning a bearing plate having a contact surface in overlying abutting relation with the channel member around each opening therethrough,
reinforcing longitudinal edges of the bearing plate to stiffen the bearing plate to resist bending,
positioning openings in the channel member in spaced relation along the longitudinal axis of the channel member,
positioning a bearing plate having a contact surface in overlying abutting relation with the channel member around each opening therethrough,
reinforcing longitudinal edges of the bearing plate to stiffen the bearing plate to resist bending,
positioning the bearing plate longitudinal edges in abutting relation with the channel member longitudinal edges,
extending an anchor bolt through the aligned openings in the bearing plate and the channel member into engagement with the rock formation to compress the bearing plate against the channel member to maintain the channel member in compressive contact with the surface of the rock formation, and
transmitting the compressive forces applied to the bearing plate from the bearing plate longitudinal edges to the channel member longitudinal edges.

23. A method as set forth in claim 22 which includes,
extending a longitudinal embossment of the bearing plate in overlying abutting relation with a longitudinal embossment of the channel member.

24. A method as set forth in claim 22 which includes,
reinforcing the channel member with a longitudinal embossment extending the length of the channel member.

25. A method as set forth in claim 24 which includes,
positioning the longitudinal embossment on the longitudinal axis of the channel member.

26. A method as set forth in claim 24 which includes,
positioning the longitudinal embossment offset from the longitudinal axis of the channel member.

27. A method as set forth in claim 24 which includes,
positioning a pair of longitudinal embossments offset from the longitudinal axis on the channel member.

28. A method as set forth in claim 22 which includes,
restraining longitudinal movement of the bearing plate on the channel member.

29. A method as set forth in claim 22 which includes,
restraining lateral movement of the bearing plate on the channel member.

30. A method as set forth in claim 22 which includes,
tightening the anchor bolt against the bearing plate to apply a compressive load upon the bearing plate,
distributing the compressive load upon the bearing plate throughout the surface of the bearing plate,
transmitting the compressive load from the bearing plate to the channel member to compress the channel member against the rock formation, and
increasing the force applied by the channel member to the rock formation as the compressive load applied by the anchor bolt to the bearing plate increases.

31. A method for supporting a rock formation comprising the steps of, positioning an elongated channel beam in contact with a surface of a rock formation, positioning openings in the channel member in spaced relation along the length of the channel member, positioning a bearing plate having a reinforced contact surface in overlying abutting relation with the channel member around each opening in the channel member, extending an anchor bolt through aligned openings in the bearing plate and the channel member into engagement with the rock formation, tightening the anchor bolt to exert a compressive load upon the bearing plate, distributing the compressive load uniformly throughout the contact surface of the bearing plate, transmitting the compressive load from the bearing plate to the surface of the channel member abutting the contact surface of the bearing plate, compressing the channel member against the rock formation, and increasing the compressive force applied by the channel member to the rock formation as the compressive load applied by the anchor bolt to the bearing plate increases.

32. A method as set forth in claim 31 which includes, positioning the reinforced contact surface of the bearing plate in abutting relation with a reinforced surface of the channel member.

33. A method as set forth in claim 31 which includes,
reinforcing the longitudinal edges of the channel member with flanges,
reinforcing the longitudinal edges of the bearing plate with flanges, and
extending the width of the bearing plate to position the bearing plate flanges in overlying abutting relation with the channel member flanges.

34. A method as set forth in claim 31 which includes, restraining the bearing plate from longitudinal movement on the channel member.

35. A method as set forth in claim 31 which includes, restraining the bearing plate from lateral movement on the channel member.

* * * * *